No. 866,701. PATENTED SEPT. 24, 1907.
H. WATSON.
RAKE.
APPLICATION FILED MAY 4, 1907.
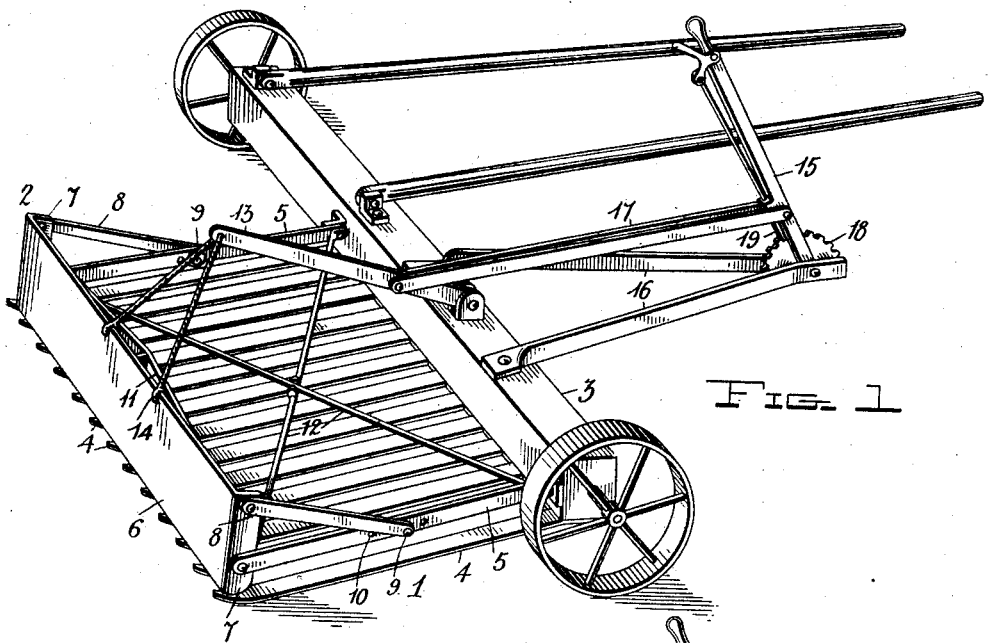
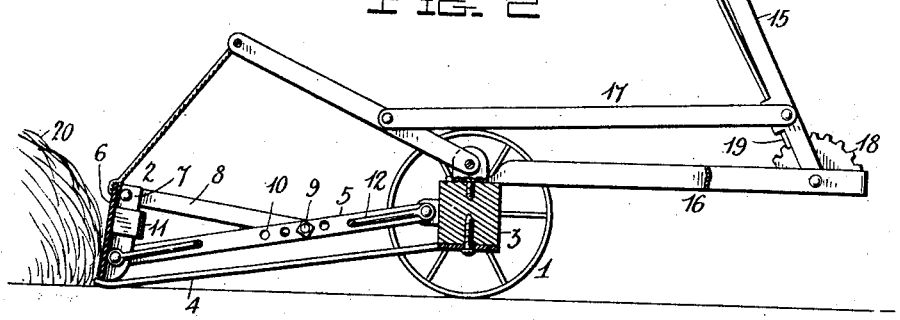
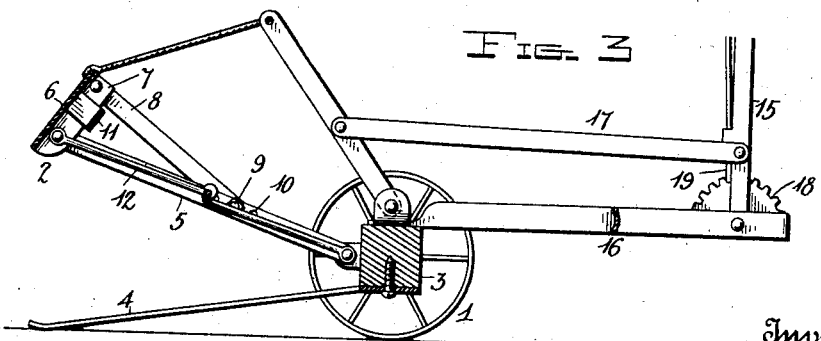
Witnesses
Inventor
Hugh Watson
by H. B. Willson & Co.
Attorneys

UNITED STATES PATENT OFFICE.

HUGH WATSON, OF CAIRO, NEBRASKA.

RAKE.

No. 866,701.  Specification of Letters Patent.  Patented Sept. 24, 1907.

Application filed May 4, 1907. Serial No. 371,927.

*To all whom it may concern:*

Be it known that I, HUGH WATSON, a citizen of the United States, residing at Cairo, in the county of Hall and State of Nebraska, have invented certain new and useful Improvements in Rakes; and I do declare the following to be a full, clear, and exact description of the invention, such as will enable others skilled in the art to which it appertains to make and use the same.

This invention relates to what are known as "sweep rakes," and more particularly to an attachment for the same, and it has for its object to provide a device of this kind which will be simple, cheap and efficient, and can be applied to any style of rake.

In the accompanying drawings, which illustrate the invention, Figure 1 is a perspective view of one form of rake provided with my attachment; Fig. 2 is a longitudinal sectional view of the rake with the attachment lowered and being used to push a load of hay after the teeth have been withdrawn; and Fig. 3 is a similar view with the attachment raised to permit of the teeth gathering a load in the field.

Referring more particularly to the drawings, 1 indicates a sweep rake of any desired construction, the one shown in the drawing being known as a "side sweep."

The attachment consists of a pushing head or panel, 2, which is pivotally secured to the rake head, 3, in any desired manner and is of such size and length as to substantially correspond with the outline of the teeth, 4, of the rake; that is, the side bars, 5, of the attachment are located substantially in line with the outer teeth, and the pushing head or panel portion, 6, extends outwardly substantially even with the front end of the teeth, 4.

The head 6 is preferably pivotally secured to the side bars 5 as by means of flanges 7, near the lower edge, and adjusting rods, 8, are connected with the upper edge of the head at their forward ends and are movably connected with the side bars 5 at their lower ends as by means of bolts, 9, which are adapted to be passed through perforations, 10, in said bars. A truss rod, 11, may be provided for the head 6 so as to give it sufficient rigidity, and braces, as cross rods, 12, may be provided for giving the desired rigidity to the entire attachment to prevent it from bending out of shape when being used, said cross rods preferably extending from the pivot point at the rear diagonally forward to the opposite corner in front, and rigidly secured together at the center, where they cross.

The panel is swung upon its pivots to hold it out of the way when loading a sweep or rake, as by means of a lever, 13, which is pivotally secured to the rake head, 3, and provided with connectors, as chains or cables, 14, which extend from the free end of the lever to the top of the panel.

The lever 13 may be operated in any manner, and any suitable means may be provided for holding it in its adjusted position for holding the panel elevated or letting it be lowered into position for use, as may be desired. In the drawings the lever 15 is shown pivotally connected to the rear end of a brace, 16, as two converging arms, which are secured at their forward ends to the rake head, 3. A link, 17, connects the lever 15 with the lever 13 for moving them in unison, and an ordinary segmental rack, 18, may be provided for being engaged by a suitable pawl or locking member 19 on the lever 15 for holding said levers and the panel in the desired position.

In using an attachment as above described, the levers are so actuated or adjusted as to hold the panel up out of the way of the rake or sweep when the latter is being loaded. After the sweep has thus been loaded and has been driven to the point where the grain is to be deposited for subsequent use, as upon a stacker, the entire sweep is moved backward, as by backing the horses, which will withdraw the teeth from under the load of grain, as shown at 20, in Fig. 3 and the panel is then lowered so that it will rest upon the tips of the teeth between the head of the sweep and the load of grain. The sweep is then again moved forward by the horses, which will cause the front plate or head of the panel to engage with the load of grain and push it onto the stacker, as will be readily understood. The panel is then again raised into its elevated position, and the sweep returned to the field for another load. The head of the panel can be so adjusted, by means of the braces, as to prevent it from jumping up when it comes in contact with the grain, the lower edge of the panel being preferably extended slightly in front of the upper edge.

By using an attachment as above described, it will be seen that the grain is prevented from sticking to the teeth of the sweep when being unloaded, and the danger of breaking the teeth of the sweep is largely eliminated. The entire attachment will add but a trifle to the weight of the sweep, yet it can be lowered onto the grain after the sweep has been filled and assist in retaining the same thereon while going to the stacker, and especially in case of windy weather.

Having described my invention, I claim:

1. In combination with a sweep rake, an attachment therefor comprising side members and a pushing head, the side members being pivotally connected with the rake and with the pushing head, and means for swinging the pushing head upon its pivots for varying its inclination.

2. In combination with a sweep rake, an attachment therefor comprising side pieces pivotally secured to the rake head, a pushing head pivotally secured at its lower edge to the free ends of said side pieces, and braces pivotally secured to the upper edge of said pushing head and adjustably secured at their rear ends to said side pieces.

3. In combination with a sweep rake, an attachment therefor comprising perforated side pieces pivotally secured to the rake head, a pushing head having its ends flanged and pivotally secured at its lower edge to said side pieces, braces pivotally secured to the upper ends of said flanges, and bolts through said perforations in the side pieces for engaging with the rear ends of said braces, and holding the pushing head in its desired position.

4. In combination with a sweep rake, a pushing head pivotally secured thereto, a lever arranged on the rake head, means for connecting the free end of the lever with the pushing head, and means for holding said lever in an adjusted position.

5. In combination with a sweep rake, a pushing head, pivotally secured thereto, a support extending rearwardly from the rake head, two levers, one of which is pivotally secured to the rake head, and the other one to said support, a link for connecting the said levers, means for connecting the outer end of the lever on the rake head to the pushing head, and locking means connected with the other lever for holding said levers and the pushing head in an adjusted position.

In testimony whereof I have hereunto set my hand in presence of two subscribing witnesses.

HUGH WATSON.

Witnesses:
J. H. HULITT,
ALBERT OFIELD.